July 27, 1943. H. J. DE N. McCOLLUM 2,325,189
VALVE FOR AUTOMOBILE HEATERS
Original Filed June 24, 1939
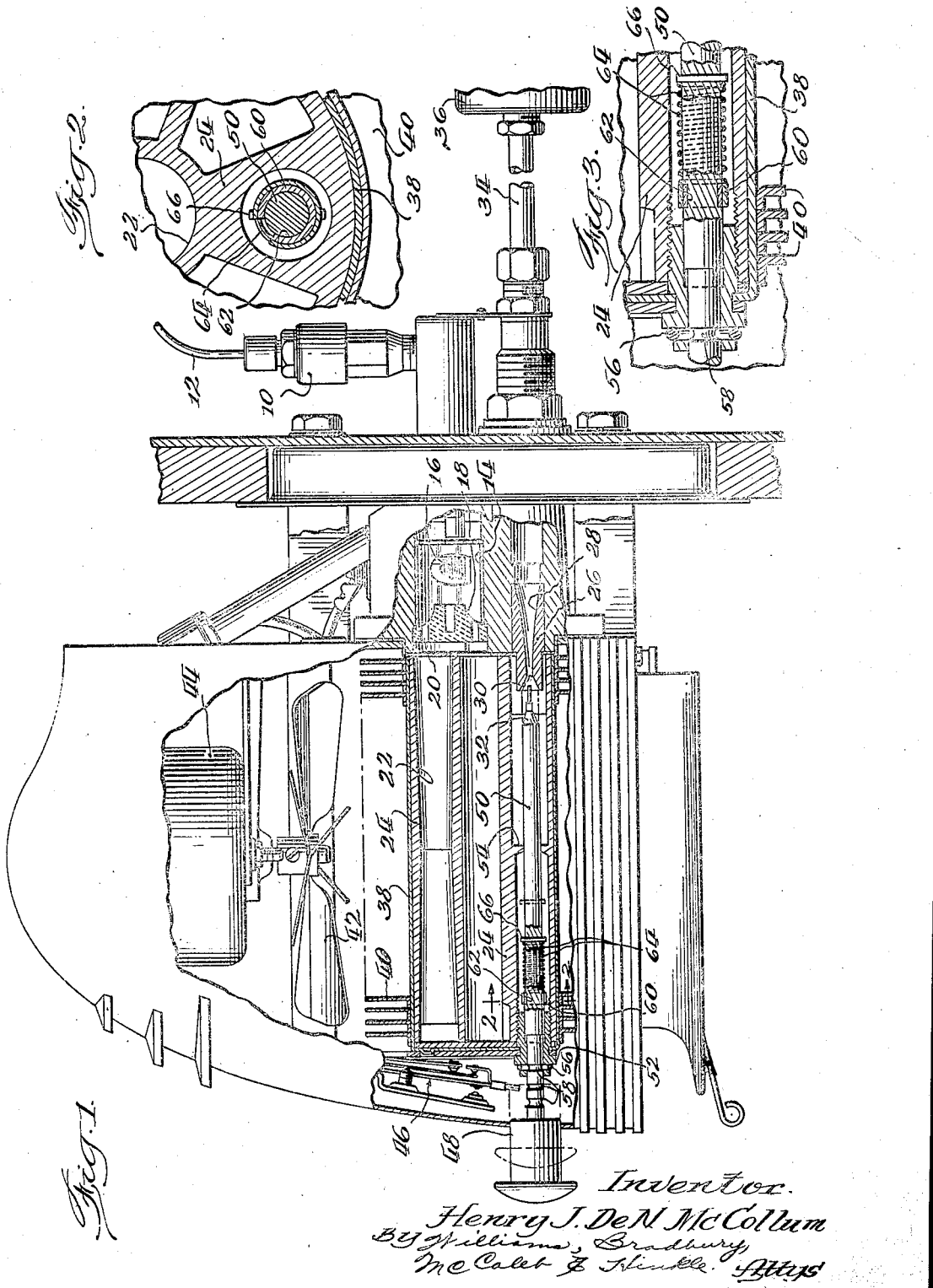
Inventor.
Henry J. DeN McCollum
By Williams, Bradbury,
McCaleb & Hinkle. Attys Patented July 27, 1943

2,325,189

UNITED STATES PATENT OFFICE 2,325,189

VALVE FOR AUTOMOBILE HEATERS

Henry J. De N. McCollum, Chicago, Ill.

Original application June 24, 1939, Serial No. 281,011, now Patent No. 2,270,955, dated January 27, 1942. Divided and this application February 17, 1940, Serial No. 319,559

3 Claims. (Cl. 137—161)

My invention relates generally to valves for automobile heaters of the internal combustion type, and more particularly to improved safety means for preventing damage to the heater and to adjacent parts of the automobile due to overheating.

This application is a division of my copending application Serial No. 281,011, filed June 24, 1939, in which the subject matter hereof is broadly claimed and which has matured into United States Letters Patent No. 2,270,955, granted January 27, 1942.

It is an object of my invention to provide an improved means for shutting off the heater whenever the temperature of the radiator element thereof becomes excessively or dangerously high.

A further object is to provide an improved shut off device for automobile heaters of the internal combustion type which will be operative to shut off the heater when the temperature thereof exceeds a predetermined maximum value, and may readily be reconditioned for operation when the heater drops to normal operating temperature.

A further object is to provide an improved thermostatically operable means to shut off the heater when a predetermined maximum temperature is exceeded.

A further object is to provide a shut off device of the above mentioned type which is simple in construction, dependable in operation, and which may be economically manufactured.

Other objects will appear from the following description, reference being had to the accompanying drawing, in which:

Figure 1 is a fragmentary sectional view of an automobile heater of the internal combustion type, showing the improved valve closing device;

Figure 2 is an enlarged fragmentary transverse sectional view taken on the line 2—2 of Figure 1; and Figure 3 is an enlarged fragmentary sectional view of a part of the valve stem and associated temperateure responsive means for closing the valve.

In automobile heaters of the internal combustion type, such as are more fully described in my United States Letters Patent Nos. 2,191,173 granted February 20, 1940, and 2,200,232, granted May 7, 1940, it is desirable to provide some means for causing discontinuance of the operation of the heater whenever the temperature of the radiator becomes excessively high. While such condition does not occur frequently, it may happen that the motor for driving the fan which circulates the air from the passenger compartment of the vehicle past the radiator, may become inoperative, and as a result, the radiator may become excessively hot and cause damage to parts of the heater or to parts of the automobile in which it is mounted, or to contents of the automobile. To prevent such damage, heaters in the past have been provided with a thermostatically operable vent valve which opened upon a predetermined maximum temperature and admitted atmospheric air to the combustion chamber of the heater, thereby rendering the mixture so lean as not to be combustible and thus causing extinguishment of the flame.

In accordance with my present invention the same purpose is accomplished in a more simple, convenient, reliable, and economical manner.

Referring to Figure 1, the heater comprises, generally, a fuel and air mixing device 10 which is supplied with liquid fuel such as gasoline through a conduit 12 and feeds a mixture of the fuel and air into a combustion chamber 14 where the combustible mixture is ignited by an igniter 16 which is preferably of the electrically heated resistance wire type. Combustion is maintained by a reigniter plug 18 having a passageway 20 through which the products of combustion flow into one end of a circuitous passageway 22 formed in a radiator casting 24. The outlet of the passageway 22 is formed by a vacuum compensator 26 having a Venturi shaped passageway 28 extending therethrough, the mouth 30 of said passageway forming a seat for a control valve 32. The products of combustion are drawn through the passageway 28 and a conduit 34 into the intake manifold 36 of the internal combustion engine of the automobile, or to any other suitable space at subatmospheric pressure.

The radiator casting 24 is surrounded by a shell 38 which has fins 40 pressed thereover, and air from the passenger compartment of the vehicle is forced downwardly past the radiator by a fan 42 driven by an electric motor 44. The supply of electrical energy to the motor 44 and to the igniter 16 is controlled by a switch mechanism designated generally by the reference character 46, so as to cause energization of the igniter 16 and the motor 44 in proper sequence. This switch mechanism is more fully disclosed and claimed in my United States Letters Patent No. 2,191,174, granted February 20, 1940. The operation of this switch mechanism is initially controlled by pulling outwardly a button or handle 48 from the position in which it is shown in dotted lines in Figure 1 to the position in which it is shown in full lines in said figure.

Rigidly attached to the control button 48 is a stem 50 for the valve 32. The stem is guided for longitudinal movement in a bushing 52 which is threaded in the radiator casting 24, and by an inwardly projecting shoulder 54 forming part of the radiator casting. The valve stem has three positions of adjustment; namely, shut off position, slow heat position, and full heat position, the stem being held in the position to which it is adjusted by a detent spring 56 which is engageable with any one of three grooves 58 formed in the stem, the detent spring 56 being held against movement in a direction parallel with the stem by suitable slots formed in the bushing 52.

The mechanism above described forms the subject matter of my aforesaid United States Letters Patent Nos. 2,191,173; 2,200,232, and 2,191,174; the invention claimed herein relating to the means for automatically closing the valve 32 when the temperature of the radiator becomes excessively high. This means comprises a bimetal thermostatic split ring 60 which at ordinary operating temperatures rests in an annular groove 62 formed in the stem 50. A spring 64 is compressed between the bimetal ring 60 and a pin 66 secured in the stem 50 and having its ends projecting therefrom, to provide an abutment for the end of the spring.

Under normal conditions of operation the bimetal ring 60 will expand slightly, but to an extent insufficient to permit its disengagement from the groove 62. When, however, the temperature of the radiator rises to an unsafe value, the bimetal ring 60 will expand radially outwardly a sufficient distance so that it will no longer be retained by the walls of the groove 62, but will be forced to the left (Figure 1) by the spring 64 until it abuts against the inner end face of the bushing 52. The spring 64 thereafter will move the valve stem 50 to the right, to close the valve 32 against its seat 30. The spring 64 is made sufficiently strong that it may readily overcome the holding force of the detent spring 56.

When the valve 32, 30 is closed the heater will, of course, be shut off and gradually drop in temperature. The heater will, however, not commence operation when the normal temperature is attained unless the control knob 48 is again pulled outwardly. Under these conditions, the bimetal ring 60 will again snap into the groove 62 and the spring 64 thus again compressed and the device conditioned for operation.

If the condition which resulted in overheating was of a temporary nature, the heater will continue to function in a normal manner. If, however, the condition which caused overheating still continued to prevail, the radiator will again rise to a temperature above the predetermined maximum permitted by the shut off device, and the latter will again operate to cause discontinuance of the operation of the heater. Thus, the operator of the vehicle will be apprized of the fact that there is some abnormal condition present which is causing the heater to tend to operate at an excessive temperature and steps may then be taken to remedy the defect.

It will be apparent that the shut off device is of very simple construction requiring the addition of but three parts (split bimetal ring 60, spring 64, and pin 66) to a heater of otherwise standard construction. It will also be clear that the device will necessarily be very reliable in operation, since the spring 64 may be made sufficiently strong to assure closing of the valve 32 under all conditions. The fact that the device is self-cocking merely upon pulling the control button 48 outwardly renders the device substantially foolproof, since the reconditioning of the device for operation is a necessary incident to causing operation of the heater.

It will be noted that in the construction shown the control knob 48 is moved inwardly (to the right) whenever the radiator temperature exceeds the predetermined maximum value, and thus the control knob is effective to open the switches included in the switch mechanism 46, since this switch mechanism has a part which extends into the path of movement of the control knob. For this reason, there is no possibility of causing a continuous drain of electrical energy for supplying the fan motor and the igniter, should the operation of the heater be interrupted by the shut off means heretofore described.

From a consideration of the principles underlying the present invention, it will be apparent to those skilled in the art that the invention may be applied to a large variety of different forms of automobile heaters and heaters of a similar type.

While I have shown and described a particular form of my invention, it will be apparent to those skilled in the art that it may be embodied in various other forms, all embodying the underlying principles of the invention. I therefore desire to include within the scope of the following claims all such equivalent constructions whereby substantially the results of my invention may be obtained by substantially the same means.

I claim:

1. In a valve assembly, in combination, a valve, a seat for said valve, manually operable means for controlling said valve, said manually operable means including a stem secured to said valve, resilient means attached to said stem and operable to close said valve, a groove formed in said stem, and a temperature responsive bimetal ring carried by said stem normally fitting in said groove and holding said resilient means out of operation, and adapted upon attainment of a predetermined maximum temperature to expand sufficiently to permit its disengagement from said groove, thereby releasing said resilient means and causing said valve to close.

2. In a valve assembly, in combination, a valve for controlling the fluid through said assembly, manually operable means for controlling said valve, said manually operable means including a stem and a bushing for guiding said stem, an annular groove formed in said stem, a shoulder carried by said stem and spaced from said groove, a temperature responsive split bimetal ring normally fitting in said groove but adapted by attainment of a predetermined abnormal temperature to be disengaged from said groove, and resilient means comprising a spring coiled about said stem and constrained between said shoulder and said ring so that when said predetermined temperature is attained said spring will force said ring from said groove and against said bushing thereby moving said stem and closing said valve.

3. In a valve assembly, in combination, a valve for controlling the flow of fluid through said assembly, manually operable means for controlling said valve, said last-named means including a valve stem having a shoulder thereon, yieldable detent means for holding said stem in one position of adjustment, resilient means capable of exerting sufficient force upon said stem in a valve closing direction to overcome the holding effect of said yieldable detent means and close said valve, and thermostatic bimetal means, normally engaging said shoulder and held in position thereby, holding said resilient means from operation and operable when the temperature of the fluid flowing through said assembly attains a predetermined maximum value to disengage itself from said shoulder, thereby releasing said resilient means and permitting the latter to close said valve.

HENRY J. DE N. McCOLLUM.